United States Patent
Akiyama et al.

(10) Patent No.: US 9,464,216 B2
(45) Date of Patent: Oct. 11, 2016

(54) PHOTO-REACTIVE ADHESIVE AGENT

(71) Applicant: National Institute of Advanced Industrial Science and Technology, Tokyo (JP)

(72) Inventors: Haruhisa Akiyama, Tsukuba (JP); Masaru Yoshida, Tsukuba (JP); Hideki Nagai, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/399,622

(22) PCT Filed: May 7, 2013

(86) PCT No.: PCT/JP2013/062853
§ 371 (c)(1),
(2) Date: Feb. 13, 2015

(87) PCT Pub. No.: WO2013/168712
PCT Pub. Date: Nov. 14, 2013

(65) Prior Publication Data
US 2015/0159058 A1    Jun. 11, 2015

(30) Foreign Application Priority Data

May 7, 2012   (JP) ................. 2012-106180

(51) Int. Cl.
| | |
|---|---|
| C09J 133/14 | (2006.01) |
| C09J 201/06 | (2006.01) |
| B32B 37/18 | (2006.01) |
| B32B 38/00 | (2006.01) |
| B32B 38/10 | (2006.01) |

(52) U.S. Cl.
CPC .............. *C09J 133/14* (2013.01); *B32B 37/18* (2013.01); *B32B 38/0008* (2013.01); *B32B 38/10* (2013.01); *C09J 201/06* (2013.01); *B32B 2310/0806* (2013.01); *B32B 2310/0831* (2013.01); *B32B 2405/00* (2013.01)

(58) Field of Classification Search
CPC ................. B29C 35/0805; B32B 2310/0806; B32B 2310/0831
USPC ............... 156/247, 272.2, 273.3, 273.5, 712
See application file for complete search history.

(56) References Cited

FOREIGN PATENT DOCUMENTS

| | | |
|---|---|---|
| JP | 2005-082604 A | 3/2005 |
| JP | 2008-303209 A | 12/2008 |
| JP | 2011-256291 A | 12/2011 |

OTHER PUBLICATIONS

Machine translation of JP Patent Publ 2011256291, Akiyama, Akihisa and Yoshida, Masaru, Dec. 2011.*

(Continued)

*Primary Examiner* — Philip Tucker
*Assistant Examiner* — Jimmy R Smith, Jr.
(74) *Attorney, Agent, or Firm* — Lucas & Mercanti, LLP (57) ABSTRACT

This invention provides an adhesive agent with a stronger adhesive force that can adhere and be peeled reversibly with the irradiation of light. With the use of a liquid crystalline polymer compound containing azobenzene or a sugar alcohol derivative containing a hydroxyl group and azobenzene, a photo-reactive adhesive agent that can strongly adhere to and be peeled from a substrate reversibly with the irradiation of light can be obtained.

12 Claims, 6 Drawing Sheets

(56) References Cited

OTHER PUBLICATIONS

Handbook of Wood Chemistry and Wood Composites, ed. Roger M. Rowell, 2005, Chap. 9, p. 223.*
Isayama, et al., Macromolecules, Apr. 2010, 43, 4105-4112.*
Li, et al., Soft Matter, Apr. 2012, 8, 5532-5542.*
Akiyama, et al, "Photochemically Reversible Liquefaction and Solidification of Single Compounds Based on a Sugar Alcohol Scaffold with Multi Azo-Arms", Adv. Mater. 2012, 24, 2353-2356.
Zettsu, et al., "Highly Efficient Photogeneration of Surface Relief Structure and Its Immobilization in Cross Linkable Liquid Crystalline Azobenzene Polymers", Macromolecules 2004, 37, 8692-8698.

* cited by examiner

PHOTO-REACTIVE ADHESIVE AGENT

CROSS-REFERENCE TO RELATED APPLICATIONS

This application is a 371 of PCT/JP2013/062853, filed May 7, 2013, which claims the benefit of Japanese Patent Application No. 2012-106180, filed May 7, 2012.

TECHNICAL FIELD

The present invention relates to a photo-reactive adhesive agent. More particularly, the present invention relates to a photo-reactive adhesive agent comprising a liquid crystalline compound, which can repeatedly adhere and peeled reversibly with the application of light.

BACKGROUND ART

Figure 1:
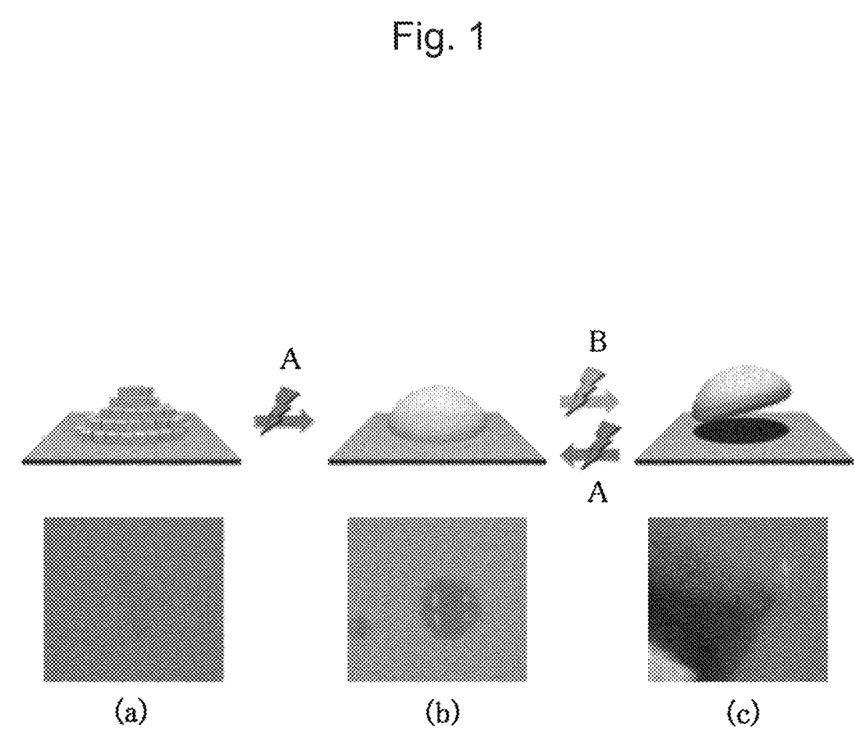
FIG. 1 schematically shows liquefaction and solidification induced by light, wherein (a) shows a powdered solid, (b) shows a liquid, and (c) shows a solid.

An example of a method for reversible fluidization/non-fluidization via irradiation of a material with light is a method in which ultraviolet light and visible light are applied to a liquid crystalline azobenzene compound (see Patent Document 1) having a sugar alcohol skeleton (Patent Document 2 and Non-Patent Document 1). FIG. 1 schematically shows such method; wherein, from the left to the right, (a) shows a powdered solid, (b) shows a liquid, and (c) shows a solid. In the figure, "A" represents irradiation of ultraviolet light and "B" represents irradiation of visible light.

Figure 2:
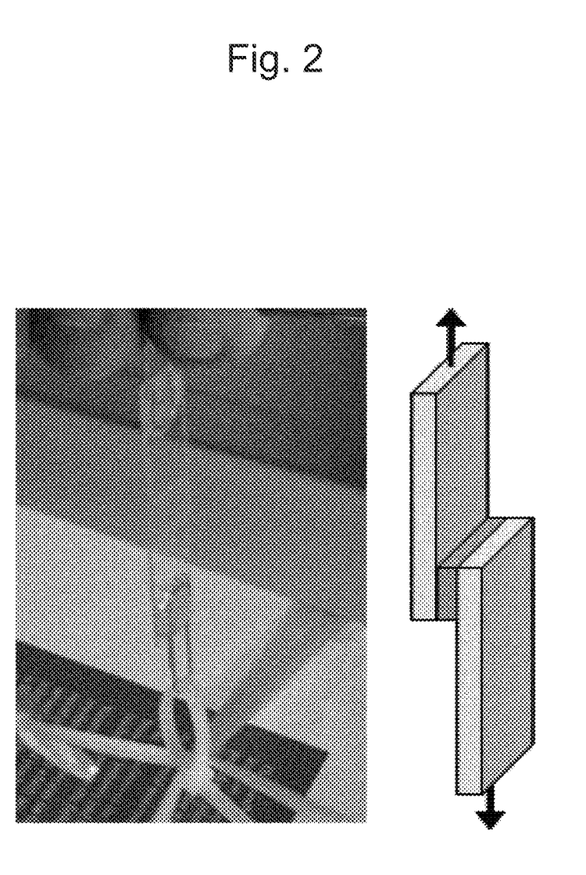
FIG. 2 shows an adhesion strength test with the use of a material that is liquefied and solidified with the application of light.

This material is a single molecule with a molecular weight of several thousands. A possible application thereof is an adhesive agent that can adhere and be peeled reversibly with the application of light. It has been difficult to peel a conventional adhesive agent without a thermal or mechanical impact, and it also has been difficult to re-adhere or recycle such conventional adhesive agents. Such problems can be overcome with the use of a material that can repeatedly adhere and peeled reversibly with the application of light; however, the liquid crystalline azobenzene compound having a sugar alcohol skeleton described above is problematic in terms of its low adhesive force at the time of adhesion (50 N/cm$^2$ in case of glass adhesion). FIG. 2 shows the adhesion strength test with the use of a material that is induced to liquefy or solidify with the application of light.

Patent Document 1: JP 2008-303209 A
Patent Document 2: JP 2011-256291 A
Patent Document 3: JP 2005-82604 A

NON-PATENT DOCUMENTS

Non-Patent Document 1: Advanced Materials 24, 2353-2356, 2012
Non-Patent Document 2: Macromolecules 37, 8692-8698, 2004

SUMMARY OF THE INVENTION

Object to be Attained by the Invention

In view of the problems with conventional photo-reactive adhesive agents described above, it is an object of the present invention to provide an adhesive agent with a stronger adhesive force that can adhere and be peeled reversibly with the irradiation of light.

Means for Attaining the Object

The present inventors have conducted concentrated studies in order to attain the above object. As a result, they discovered that a photo-reactive adhesive agent that can strongly adhere to and be peeled from a substrate reversibly with the irradiation of light would be obtained with the use as a main component of a liquid crystalline polymer compound comprising azobenzene or a sugar alcohol derivative comprising a hydroxyl group and azobenzene. This has led to the completion of the present invention.

The present invention has been completed based on the finding described above. The present invention provides the following.

[1] A photo-reactive adhesive agent comprising, as a main component, a liquid crystalline compound having 2 or more photo-reactive side chains represented by General Formula (1):

(1)

wherein m is an integer of 0 to 20 and l is an integer of 1 to 20, the liquid crystalline compound being a liquid crystalline polymer compound with a weight average molecular weight of 1,000 to 100,000, which is obtained by polymerizing a monomer represented by General Formula (2):

(2)

wherein $R_1$ represents a photo-reactive side chain represented by General Formula (1) and $R_2$ represents hydrogen or a methyl group or a sugar alcohol derivative represented by General Formula (3):

(3)

wherein R represents a hydrogen atom or a group represented by General Formula (4) below, at least 1 R represents a hydrogen atom, at least 1 another R represents a group represented by General Formula (4) below, and n is an integer of 1 to 4:

(4)

wherein m and l are each as defined with respect to General Formula (1).

[2] The photo-reactive adhesive agent according to [1], which is peeled through fluidization with the irradiation of light.

[3] The photo-reactive adhesive agent according to [2], wherein ultraviolet light in the wavelength range of 300 to 400 nm is irradiated and the light exposure dose is 0.1 to 200 J/cm².

[4] The photo-reactive adhesive agent according to any of [1] to [3], which adheres through non-fluidization with the irradiation of light in a wavelength range that is different from that of the light used for fluidization.

[5] The photo-reactive adhesive agent according to [4], wherein light in the wavelength range of 400 to 600 nm is irradiated.

[6] The photo-reactive adhesive agent according to any of [1] to [5], which repeatedly adheres and is peeled through reversible fluidization and non-fluidization with the irradiation of lights in different wavelength ranges.

[7] A method of adhesion and peeling with the use of the photo-reactive adhesive agent according to any of [1] to [6] through reversible fluidization and non-fluidization with the irradiation of lights in different wavelength ranges.

[8] The method according to [7], wherein the adhesive agent is peeled through fluidization with the irradiation of ultraviolet light in the wavelength range of 300 to 400 nm.

[9] The method according to [8], wherein the adhesive agent adheres through non-fluidization with the irradiation of light in the wavelength range of 400 to 600 nm.

Effects of the Invention

According to the present invention, the adhesive strength at the time of adhesion of the photo-reactive adhesive agent that can adhere and be peeled with the application of light can be enhanced.

EMBODIMENTS FOR CARRYING OUT THE INVENTION

The photo-reactive adhesive agent of the present invention comprises, as a main component, a liquid crystalline compound containing azobenzene. The liquid crystalline compound is a liquid crystalline polymer compound containing azobenzene that is obtained by polymerizing a monomer represented by General Formula (2):

wherein $R_1$ represents a photo-reactive side chain represented by General Formula (1) below, and $R_2$ represents hydrogen or a methyl group:

wherein m is an integer of 0 to 20, and l is an integer of 1 to 20, or a sugar alcohol derivative containing a hydroxyl group and azobenzene represented by General Formula (3):

wherein R represents a hydrogen atom or a group represented by General Formula (4) below, at least 1 R represents a hydrogen atom, at least 1 another R represents a group represented by General Formula (4) below, and n is an integer of 1 to 4:

wherein m and l are each as defined with respect to General Formula (1). Such adhesive agent can strongly adhere to a substrate or be peeled therefrom reversibly with the irradiation of light.

The liquid crystalline polymer compound containing azobenzene obtained by polymerizing a monomer represented by General Formula (2) of the present invention is a liquid crystalline compound that is used for a rewritable recording medium described in Patent Document 3. In the sugar alcohol derivative containing a hydroxyl group and azobenzene represented by General Formula (3) of the present invention, at least 1 hydroxyl group remains unesterified, unlike the sugar alcohol esters described in Patent Documents 1 and 2.

When the photo-reactive adhesive agent of the present invention is subjected to adhesion, a liquid crystalline polymer compound having a photoisomerizable group or a sugar alcohol derivative having a photoisomerizable group and a hydroxyl group is in a non-fluidized state. When the compound is irradiated with light, the adhesive agent is softened, and the adhesive force is weakened. When the softened adhesive agent is irradiated with another light, the strong adhesive force is recovered. In such a case, an adhesive agent comprising such compound is considered to exert a strong adhesive force at the time of adhesion because of multipoint adsorption of a polymer, formation of a polymer network structure, or hydrogen bonding of hydroxyl groups, unlike conventional light-controlled adhesive agents.

The liquid crystalline polymer compound having a photoisomerizable group or the sugar alcohol derivative having a photoisomerizable group and a hydroxyl group of the present invention is in a solid state at temperatures around room temperature in the presence of normal light. When it is used as an adhesive agent, accordingly, the adhesive agent is molten via heating, sandwiched between the layers to be adhered to each other, and it is then cooled to solidify. Thus, such layers adhere to each other. Alternatively, the adhesive agent is liquefied with the irradiation of ultraviolet light, the resultant is sandwiched between the layers to be adhered to each other, and visible light is then applied thereto, so as to solidify the adhesive agent. Thus, such layers adhere to each other. Further, the adhesive agent may be processed in the form of a sheet or tape in advance and the resultant may then be sandwiched between two objects to be adhered to each other. Thereafter, the resultant may be liquefied and then solidified in the manner described above. Thus, two objects adhere to each other. Furthermore, the adhesive agent may be dissolved in a solvent, the resulting solution may be applied to a surface of an object to be subjected to adhesion, the resultant may be dried, and it may then be liquefied and then solidified. Thus, two objects adhere to each other. When the adhesive agent is liquefied thermally, it is necessary that the adhesive agent be heated to a temperature equal to or higher than the melting point, the glass transition point, or the softening point (at least 80° C.) in accordance with the chemical structure of the adhesive agent.

According to the method of the present invention described above, the fluidity can be reversibly controlled with the irradiation of lights in different wavelength ranges. A liquid crystalline molecule having a polymer structure or a liquid crystalline molecule having a hydroxyl group comprises a cis-trans photoisomerizable side chain, and it remains cis-trans photoisomerizable even if it has lost fluidity. The compound is subjected to the reaction in condition that it has lost fluidity, the compound is softened due to a significant change in the molecular structure, and it is then converted into a fluidized state. The resultant is irradiated with light again or it is simply allowed to stand. Thus, a reverse reaction takes place, and fluidity is lost again. According to the method of the present invention, such procedure can be repeatedly carried out.

In principle, liquefaction and solidification with the application of light are caused by changes in molecular configurations. Changes in material conditions are significantly influenced by molecular configuration in addition to temperature. For example, although trans-fatty acid and cis-fatty acid have the same chemical composition, the melting point of trans-fatty acid is higher. Azobenzene has heretofore been known to be photoisomerized in both trans-to-cis and cis-to-trans directions in a solution. As a result of such changes in unsubstituted azobenzene, it is known that the cis form becomes dominant when irradiated with ultraviolet light and that the trans form becomes dominant when irradiated with visible light, as represented by the formula shown below. However, unsubstituted azobenzene does not undergo photo-induced transition from a solid state to a liquid state at room temperature because unsubstituted azobenzene is crystalline in a solid state.

Figure 3:
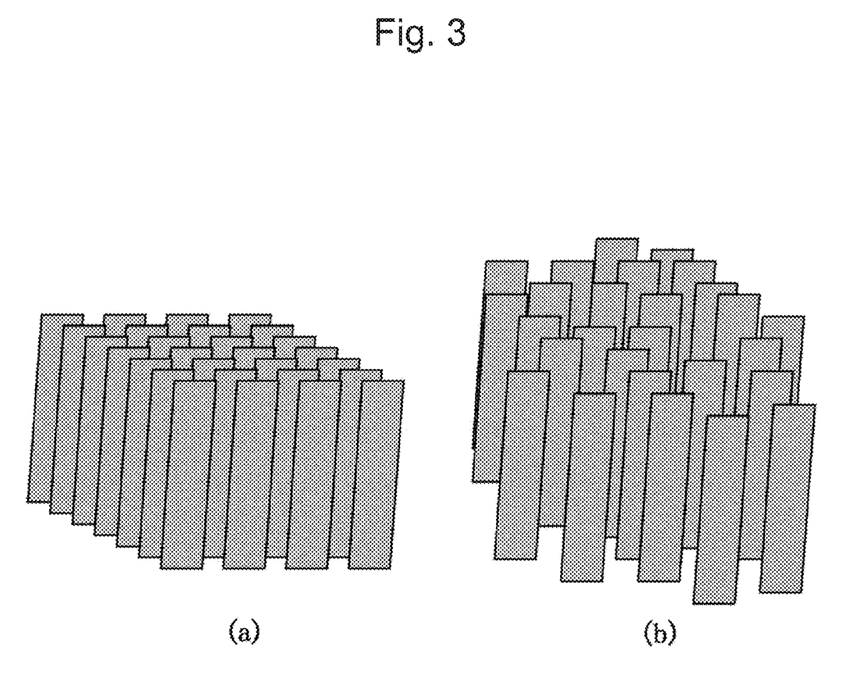
FIG. 3 schematically shows a difference in molecular packing between a crystal and a liquid crystal phase, wherein (a) shows a crystalline material (a packed configuration) and (b) shows a liquid crystalline glass (a configuration including free volume).

In general, photo-induced reactions hardly occur in the crystalline material in a solid state because of a lack of the free volume that is necessary to cause structural changes, due to the dense aggregation of molecules in a crystal. In contrast, it is naturally more difficult for a material exhibiting liquid crystalline properties upon heating to form a dense arrangement of molecules than it is for a crystal. Even if a material is in a solid phase instead of the liquid crystal phase at room temperature, accordingly, such material is expected to comprise a sufficient free volume and to be capable of photoreaction. FIG. 3 schematically shows differences in molecular packing between a crystal phase and a liquid crystal phase, wherein (a) shows a crystalline material (a packed configuration) and (b) shows a liquid crystalline glass (a configuration including free volume).

Also, there are numerous amorphous polymers that do not exhibit liquid crystalline properties upon heating and do not exhibit crystalline properties at room temperature. Such polymers become glass solids upon freezing of the motility of the main chain. Even if such polymers comprise photoreactive azobenzene sites and have trans-cis photoreactivity, the influence of the structural change at the photo-reactive site is lowered. Thus, it is deduced to be difficult to liquefy the polymer, although it may not be impossible.

Conventional adhesive agents that can adhere and be peeled reversibly with the application of light (Patent Document 2 and Non-Patent Document 1) involve the use of liquid crystalline photo-reactive substances. In this case, such liquid crystalline photo-reactive substances are single compounds with molecular weights of several thousands, and the strength of adhesion to a glass substrate was 50 $N/cm^2$, which was lower than that of a commercially available adhesive agent by a single digit.

Figure 4:
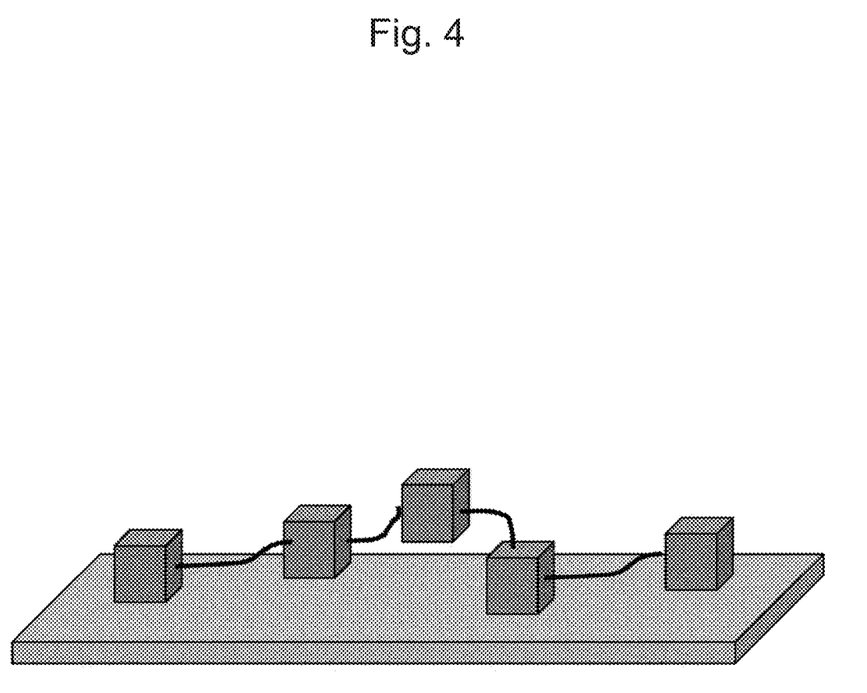
FIG. 4 schematically shows multipoint adsorption of a polymer to a substrate.

Such phenomenon occurs because of the stripping of the adhered surface and the fracture of the bonded articles (cohesive fracture). With the use of a liquid crystalline polymer, adhesive molecules adsorb to the adherent surface at multiple points, and the strength of adhesion to the surface is increased while photoreactivity is maintained. Thus, surface fracture is less likely to occur. FIG. 4 schematically shows multipoint adsorption of a polymer to a substrate. As shown in FIG. 4, molecules that constitute an adhesive agent interact with each other at multiple points, and such molecules are strongly bound to each other. In addition, a network structure peculiar to polymer chains is formed, and the resulting polymer becomes more tolerant to cohesive fracture. With the use as an adhesive agent of a liquid crystalline polymer with a high molecular weight, accordingly, high adhesion strength can be expected while photoreactivity is maintained.

While high adhesion strength is realized as the molecular weight of the polymer is increased, fluidity is lowered upon liquefaction with the application of light, and this causes deterioration of the peelability, disadvantageously.

Accordingly, a photo-reactive liquid crystalline polymer compound is considered to have suitable structure for an adhesive agent that repeatedly adheres and is peeled with the application of light. When such compound is used for an adhesive agent, the weight average molecular weight thereof is preferably 1,000 to 100,000, and more preferably 5,000 to 50,000, in terms of polystyrene standard.

While such liquid crystalline polymer compounds having photo-reactive groups had heretofore been known, in the past that, such compounds were not known to be liquefied and solidified with the application of light. This is because photo-reactive liquid crystalline polymer materials that were solid at room temperature would not be liquefied with the irradiation of light from a general light source.

That is, light would not penetrate the polymer due to the excessively high density of the azobenzene pigment, and the liquefaction of the entire polymer was not detected.

While trans-to-cis isomerization of azobenzene is necessary for liquefaction, irradiation of light in a wavelength range such that the light would not be absorbed by the cis form is necessary in order to enhance isomerization ability. Such wavelengths vary depending on molecular structures in the vicinity of azobenzene molecules, and it is 360 to 380 nm in the case of the material used herein. Even with the irradiation of light in such wavelength range, the light would not penetrate the polymer in the beginning because of self absorption, and the reaction occurs only in regions close to the surface. As the trans-to-cis reaction proceeds, the amount of the light absorbed is decreased, the light penetrates the polymer, the entire polymer reacts with light, and the polymer is then liquefied. When the polymer is to be solidified, light in a wavelength range around 500 nm, which is less likely to be absorbed by cis-azobenzene, may be used. Thus, the light would penetrate the polymer, the reaction would proceed, and cis-azobenzene would then be immediately converted into trans-azobenzene.

That is, selection of an adequate wavelength for a material would enable reversible liquefaction and solidification with the application of light. According to the method of controlling adhesive properties of the compound of the present invention with the irradiation of light, fluidity is lost when a photoisomerizable group is in a trans form, and fluidity is gained when it is in a cis form.

In the past, the liquefaction and solidification of photo-reactive liquid crystalline compounds could not be detected for the reasons described above. When such material is used as a peelable adhesive agent, it is not necessary that the entire material is liquefied. That is, it is sufficient if the interface between the layers to be adhered to each other is liquefied. Accordingly, an adhesive agent becomes peelable when it is irradiated with ultraviolet light in a wavelength of between of 300 and 400 nm, which is mainly absorbed by a trans form. In the case of the azobenzene derivative, ultraviolet light at around 360 to 380 nm, and more preferably around 365 nm, is irradiated, so as to isomerize the derivative into a cis form, thereby allowing more efficient peeling of the adhesive agent. In contrast, light at around 400 to 600 nm, and more preferably visible light at around 500 nm, is irradiated, so as to isomerize the azobenzene derivative into a trans form, thereby allowing the adhesive agent to adhere to the target.

According to the method of controlling adhesive properties with the use of a liquid crystalline compound of the present invention with the irradiation of light to the compound, the light exposure dose varies depending on a type of light source and thickness of the sample, and it is 0.1 to 200 J/cm$^2$, with a dose of 0.5 to 100 J/cm$^2$ being preferable.

Figure 5:
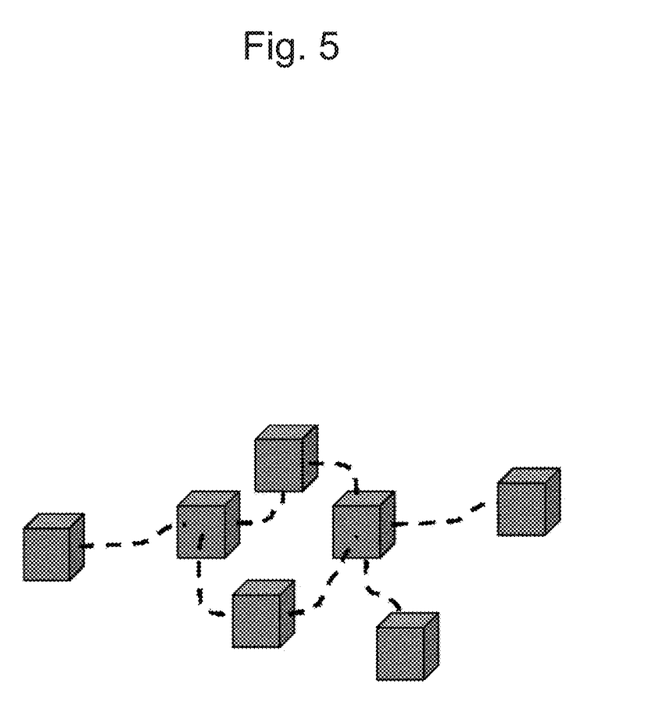
FIG. 5 schematically shows a network structure (a pseudopolymer structure) formed through hydrogen bonding (indicated by a dotted line).

It is also effective to use a hydrogen-binding material as a means for enhancing adhesion strength while maintaining photoreactivity. Since intermolecular hydrogen bonding enables formation of a pseudopolymeric structure of connected molecules, improvement in adhesion strength, as with the case of a liquid crystalline polymer compound, can be expected. FIG. 5 schematically shows a network structure (a pseudopolymer structure) formed through hydrogen bonding (indicated by a dotted line).

Accordingly, it is preferable that a compound having a hydroxyl group comprise one or more hydroxyl groups and photo-reactive groups in its molecules. With respect to hydrogen-binding units, in addition to hydroxyl groups, amino groups, carboxylic acid residues, and amide groups can be expected to exert effects similar to those of hydroxyl groups.

EXAMPLES

Hereafter, the present invention is described in greater detail with reference to the examples, although the present invention is not limited to these examples.

Example 1

10-[4-{(4-hexyl)phenylazo}phenoxy]decyl acrylate was subjected to radical polymerization in a solution, and the liquid crystalline polymer compound (A) with the weight average molecular weight of 32,000 represented by Chemical Formula A below was obtained. A polymer compound having the same structure, although with a different molecular weight, has already been reported (see Non-Patent Document 2).

Chemical Formula A

A trace amount of the liquid crystalline polymer compound (A) was applied to a glass substrate and irradiated with ultraviolet light with a center wavelength of around 366 nm with the use of an LED light source (Nichia Corporation) at room temperature (about 25° C.). As a result of irradiation with light for 1 minute (12 J/cm$^2$), powder was converted into a viscous liquid like starch syrup. Also, the sample was observed between two polarizers orthogonal to each other. As a result, the sample was found to remain dark and to be an isotropic and viscous liquid.

Example 2

About 1 mg of the liquid crystalline polymer compound (A) that had not been irradiated with light was taken, sandwiched between two glass substrates in a molten state with heating, and spread over an area of 12 mm×4 mm. The glass substrates adhered to each other as a result of cooling. The adhered glass substrates were irradiated with ultraviolet light with a center wavelength of 366 nm with the use of an LED light source (Nichia Corporation) at room temperature (about 25° C.) for 1 minute (12 J/cm$^2$) for liquefaction. As a result, it was possible to detach the glass substrates from each other with fingers.

Example 3

The two glass substrates sandwiching the liquefied sample were irradiated with visible light with a center wavelength of 510 nm with the use of an LED light source for 1 minute (1 J/cm²). As a result, the adherent surface remained transparent; however, the two glass substrates could not be detached from each other with fingers. When these glass substrates were pulled away from each other in opposite directions, they did not detach from each other. The glass substrates were subjected to a tensile strength test and it was found that they could be detached from each other when a mechanical force of 298 N/cm² was applied. The tensile strength thereof significantly exceeded the maximal adhesive strength of the conventional sugar alcohol ester material (i.e., 50 N/cm²) (Patent Document 2).

Example 4

A small amount of the liquid crystalline polymer compound (B) (weight average molecular weight: 16,500) represented by Chemical Formula B below (Patent Document 3) was taken and heated with the use of a heat gun for liquefaction. The liquefied compound was sandwiched between two glass plates (width: 15 mm; thickness: 1 mm), thinly spread, and then cooled to room temperature. A force was applied by pinching the two glass plates sandwiching the material between the first finger and the thumb, so as to detach the plates from each other, although the glass plates did not move at all. Thus, a strong adhesive force was observed. The glass plates were irradiated with ultraviolet light with a center wavelength of 366 nm with the use of an LED light source (Nichia Corporation) at room temperature for 3 minutes (36 J/cm²). As a result, the material sandwiched between the glass plates was liquefied, the adhesive force was then weakened, and the two glass plates could be easily detached from each other by pinching them with fingers (5 N/cm² or less).

Chemical Formula B

Example 5

The glass plates were irradiated with visible light (1 J/cm²) without any further processing, the adhesive force was regained as the material was solidified, and the plates did not move at all even when a force was applied by pinching the plates with fingers. The glass plates were pulled away from each other in opposite directions, and they were detached from each other when a force of 280 N/cm² was applied.

Example 6

A small amount of the liquid crystalline polymer compound (C) (weight average molecular weight: 18,000) represented by Chemical Formula C below (Patent Document 3) was taken and heated to 120° C. for liquefaction. The liquefied compound was sandwiched between two glass plates (width: 15 mm; thickness: 1 mm), thinly spread, and then cooled to room temperature. A force was applied by pinching the two glass plates sandwiching the material between the first finger and the thumb, so as to detach the plates from each other, although the glass plates did not move at all. Thus, a strong adhesive force was observed. The glass plates were irradiated with ultraviolet light with a center wavelength of 366 nm with the use of an LED light source (Nichia Corporation) at room temperature for 3 minutes (36 J/cm²). As a result, the material sandwiched between the glass plates was liquefied, the adhesive force was then weakened, and the two glass plates could be easily detached from each other by pinching them with fingers (5 N/cm² or less).

Chemical Formula C

Example 7

The glass plates were irradiated with visible light with a center wavelength of 510 nm with the use of an LED light source (1 J/cm²) without any further processing, the adhesive force was regained as the material was solidified, and the plates did not move at all even when a force was applied by pinching the plates with fingers. The glass plates were pulled away from each other in opposite directions, and the plates were detached from each other when a force of 193 N/cm² was applied.

Example 8

A small amount of the liquid crystalline polymer compound (D) (weight average molecular weight: 9,600) represented by Chemical Formula D below (Patent Document 3) was taken and heated with the use of a heat gun for liquefaction. The liquefied compound was sandwiched between two glass plates (width: 15 mm; thickness: 1 mm), thinly spread, and then cooled to room temperature. A force was applied by pinching the two glass plates sandwiching the material between the first finger and the thumb, so as to detach the plates from each other, although the glass plates did not move at all. Thus, a strong adhesive force was observed. The glass plates were irradiated with ultraviolet light with a center wavelength of 366 nm with the use of an LED light source (Nichia Corporation) at room temperature for 3 minutes (36 J/cm²). As a result, the material sandwiched between the glass plates was softened, the adhesive force was then weakened, and the two glass plates could be detached from each other when a force of 20 N/cm² was applied.

Chemical Formula D

Example 9

The glass plates were irradiated with visible light with a center wavelength of 510 nm with the use of an LED light source (1 J/cm$^2$) without any further processing, the adhesive force was regained as the material was solidified, and the plates did not move at all even when a force was applied by pinching the plates with fingers. The glass plates were pulled away from each other in opposite directions, and the plates were detached from each other when a force of 280 N/cm$^2$ was applied.

Example 10

A small amount of the liquid crystalline polymer compound (E) (weight average molecular weight: 8,100) represented by Chemical Formula E below (Patent Document 3) was taken and heated to 120° C. for liquefaction. The liquefied compound was sandwiched between two glass plates (width: 15 mm; thickness: 1 mm), thinly spread, and then cooled to room temperature. A force was applied by pinching the two glass plates sandwiching the material between the first finger and the thumb, so as to detach the plates from each other, although the glass plates did not move at all. Thus, a strong adhesive force was observed. The glass plates were irradiated with ultraviolet light with a center wavelength of 366 nm with the use of an LED light source (Nichia Corporation) at room temperature for 3 minutes (36 J/cm$^2$). As a result, the material sandwiched between the glass plates was liquefied, the adhesive force was then weakened, and the two glass plates could be easily detached from each other by pinching them with fingers (5 N/cm$^2$ or less).

Chemical Formula E

Example 11

The glass plates were irradiated with visible light with a center wavelength of 510 nm with the use of an LED light source (1 J/cm$^2$) without any further processing, the adhesive force was regained as the material was solidified, and the plates did not move at all even when a force was applied by pinching the plates with fingers. The glass plates were pulled away from each other in opposite directions, and the plates were detached from each other when a force of 202 N/cm$^2$ was applied.

Example 12

Synthesis of compound represented by formula shown below

In the formula above, R represents a hydrogen atom or a group represented by a formula shown below, at least one R represents a hydrogen atom, and at least another R represents a group represented by the formula shown below.

Figure 6:
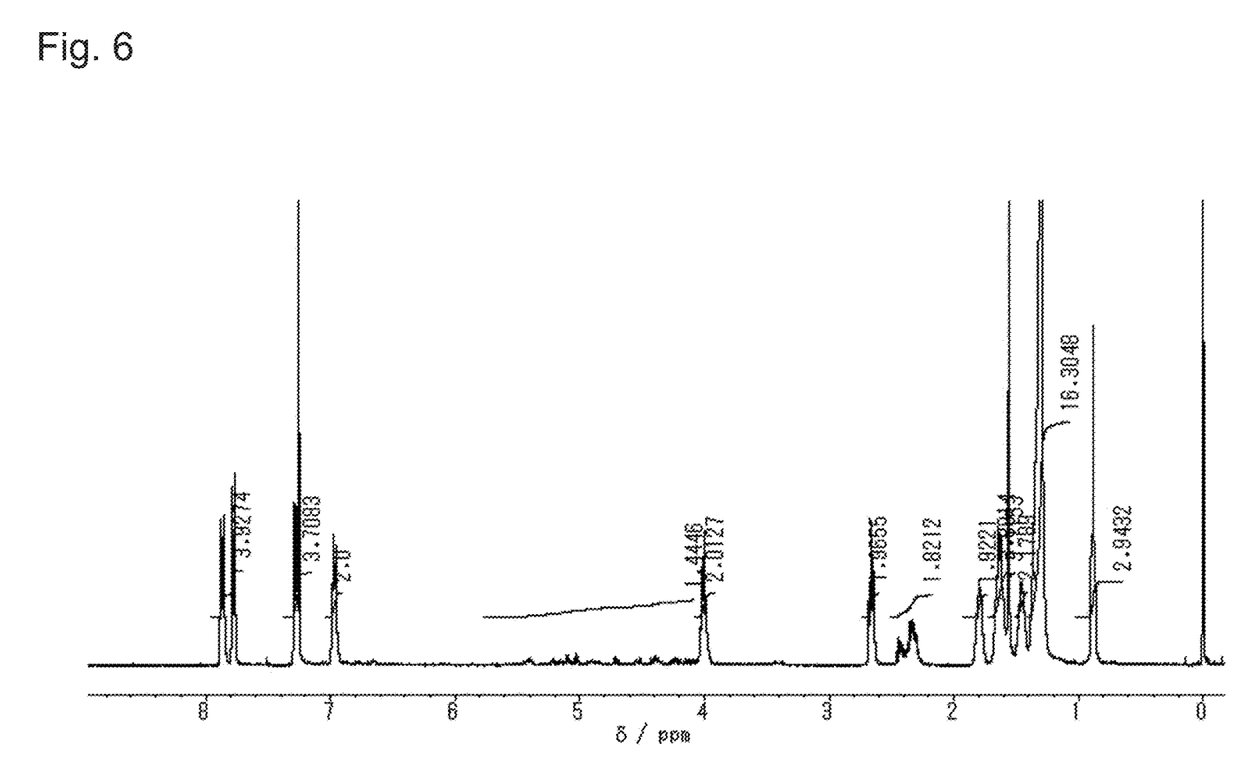
FIG. 6 shows NMR spectra for the compound obtained in Example 12.

Thionyl chloride (1.9 g) was added to 5 g of 11-[4-(4-hexylphenylazo)phenoxy]undecanoic acid, the mixture was heated under reflux for 1 hour, thionyl chloride was removed by distillation, and 12 ml of anhydrous dichloromethane was added thereto. The solution was slowly added to a suspension of 217 mg of D-mannitol in 2 ml of anhydrous pyridine, and the resultant was then subjected to reflux for 2 hours. In the dark, the resultant was subjected to separation through a chromatocolumn using, as an eluent, dichloromethane containing a small amount of ethanol, and 0.6 g of the target compound was obtained. FIG. 6 shows NMR spectra for the resulting compound. On the basis of the integrated intensity of the peaks of the NMR spectra, on average, 4 out of the 6 hydroxyl groups are predicted to have been substituted with azobenzene groups.

Example 13

A small amount of the compound obtained in Example 12 was taken and heated with the use of a heat gun for liquefaction. The liquefied compound was sandwiched between two glass plates (width: 12 mm; thickness: 1 mm), thinly spread, and then cooled to room temperature. A force was applied by pinching the two glass plates sandwiching the material between the first finger and the thumb, so as to detach the plates from each other, although the glass plates did not move at all. Thus, a strong adhesive force was observed. The glass plates were irradiated with ultraviolet light with a center wavelength of 366 nm with the use of an LED light source (Nichia Corporation) at room temperature for 1 minute (12 J/cm$^2$). As a result, the material sandwiched between the glass plates was liquefied, the adhesive force was then weakened, and the two glass plates could be easily detached from each other by pinching them with fingers.

Example 14

The glass plates were irradiated with visible light with a center wavelength of 510 nm with the use of an LED light source (1 J/cm$^2$) without any further processing, the adhesive force was regained as the material was solidified, and the plates did not move at all even when a force was applied by pinching the plates with fingers. The glass plates were pulled away from each other in opposite directions, and the plates were detached from each other when a force of 210 N/cm$^2$ was applied.

Comparative Example 1

Compound Represented by Formula Below (Patent Document 2)

In the formula above, R represents a group represented by the formula shown below.

A small amount of the compound for comparison was taken and heated to 120° C. to melt. The molten compound was sandwiched between two glass slides, thinly spread, and then cooled to room temperature. The glass slides were pulled away from each other in opposite directions, and the glass slides were peeled from each other when a force of 50 N/cm² was applied.

Subsequently, the glass slides adhering to each other were irradiated with ultraviolet light at around 366 nm at room temperature for 3 minutes (36 J/cm²), and the adherent layer between the glass slides was liquefied. The liquefied layer was continuously irradiated with visible light, and it was solidified as a consequence. The glass slides were pulled away from each other in opposite directions, and they were peeled from each other when a force of 100 N/cm² was applied. The peeling force demonstrated above (50 to 100 N/cm²) was weaker than that observed in the examples.

The invention claimed is:

1. A method of adhesion and peeling with the use of a photo-reactive adhesive agent through reversible non-fluidization and fluidization at about 25° C. with the irradiation of lights in different wavelength ranges, wherein the photo-reactive adhesive agent comprises, as a main component, a liquid crystalline compound having 2 or more photo-reactive side chains represented by General Formula (1):

(1)

wherein m is an integer of 0 to 20 and l is an integer of 1 to 20, the liquid crystalline compound being a liquid crystalline polymer compound with a weight average molecular weight of 1,000 to 100,000, which is obtained by polymerizing a monomer represented by General Formula (2):

wherein $R_1$ represents a photo-reactive side chain represented by General Formula (1) and $R_2$ represents hydrogen or a methyl group and wherein the liquid crystalline compound is solid at about 25° C. under a visible light.

2. The method according to claim 1, wherein the adhesive agent is peeled through fluidization with the irradiation of light.

3. The method according to claim 2, wherein ultraviolet light in the wavelength range of 300 to 400 nm is irradiated and the light exposure dose is 0.1 to 200 J/cm².

4. The method according to claim 1, wherein the adhesive agent adheres through non-fluidization with the irradiation of light in the wavelength range of 400 to 600 nm.

5. The method according to claim 2, wherein the adhesive agent adheres through non-fluidization with the irradiation of light in the wavelength range of 400 to 600 nm.

6. The method according to claim 3, wherein the adhesive agent adheres through non-fluidization with the irradiation of light in the wavelength range of 400 to 600 nm.

7. The method according to claim 1, wherein the adhesive agent repeatedly adheres and is peeled through reversible non-fluidization and fluidization with the irradiation of lights in different wavelength ranges.

8. The method according to claim 2, wherein the adhesive agent repeatedly adheres and is peeled through reversible non-fluidization and fluidization with the irradiation of lights in different wavelength ranges.

9. The method according to claim 3, wherein the adhesive agent repeatedly adheres and is peeled through reversible non-fluidization and fluidization with the irradiation of lights in different wavelength ranges.

10. The method according to claim 4, wherein the adhesive agent repeatedly adheres and is peeled through reversible non-fluidization and fluidization with the irradiation of lights in different wavelength ranges.

11. The method according to claim 5, wherein the adhesive agent repeatedly adheres and is peeled through reversible non-fluidization and fluidization with the irradiation of lights in different wavelength ranges.

12. The method according to claim 6, wherein the adhesive agent repeatedly adheres and is peeled through reversible non-fluidization and fluidization with the irradiation of lights in different wavelength ranges.

* * * * *